United States Patent [19]

Daman

[11] 4,066,738

[45] Jan. 3, 1978

[54] PROCESS FOR PRODUCING A FUEL GAS AND SULFUR FROM A HYDROCARBON FUEL

[75] Inventor: Ernest L. Daman, Westfield, N.J.

[73] Assignee: Foster Wheeler Energy Corporation, Livingston, N.J.

[21] Appl. No.: 743,444

[22] Filed: Nov. 19, 1976

[51] Int. Cl.$^2$ ............................................. C01B 17/06
[52] U.S. Cl. .................................... 423/569; 423/571; 48/197 R; 48/211
[58] Field of Search ................ 423/244, 569, 571, 57; 48/197, 203, 211

[56] References Cited

U.S. PATENT DOCUMENTS 3,969,089  7/1976  Moss et al. ...................... 423/244 X

FOREIGN PATENT DOCUMENTS 1,336,563  11/1973  United Kingdom.

OTHER PUBLICATIONS

"Chemical Engineering," Jan. 6, 1976, pp. 74–75.

*Primary Examiner*—G. O. Peters
*Attorney, Agent, or Firm*—Marvin A. Naigur; John E. Wilson

[57] ABSTRACT

A process for producing a fuel gas and sulfur from a hydrocarbon fuel wherein a fuel oil containing sulfur is at least partially combusted in a fluidized bed of sorbent material which produces a substantially sulfur free fuel gas and a sulfided sorbent. The sulfided sorbent is passed to a second fluidized bed which regenerates the sulfided sorbent and produces a sulfur dioxide containing gas. The latter gas is contacted with granular coal in the presence of steam to reduce the sulfur dioxide to elemental sulfur.

3 Claims, 1 Drawing Figure

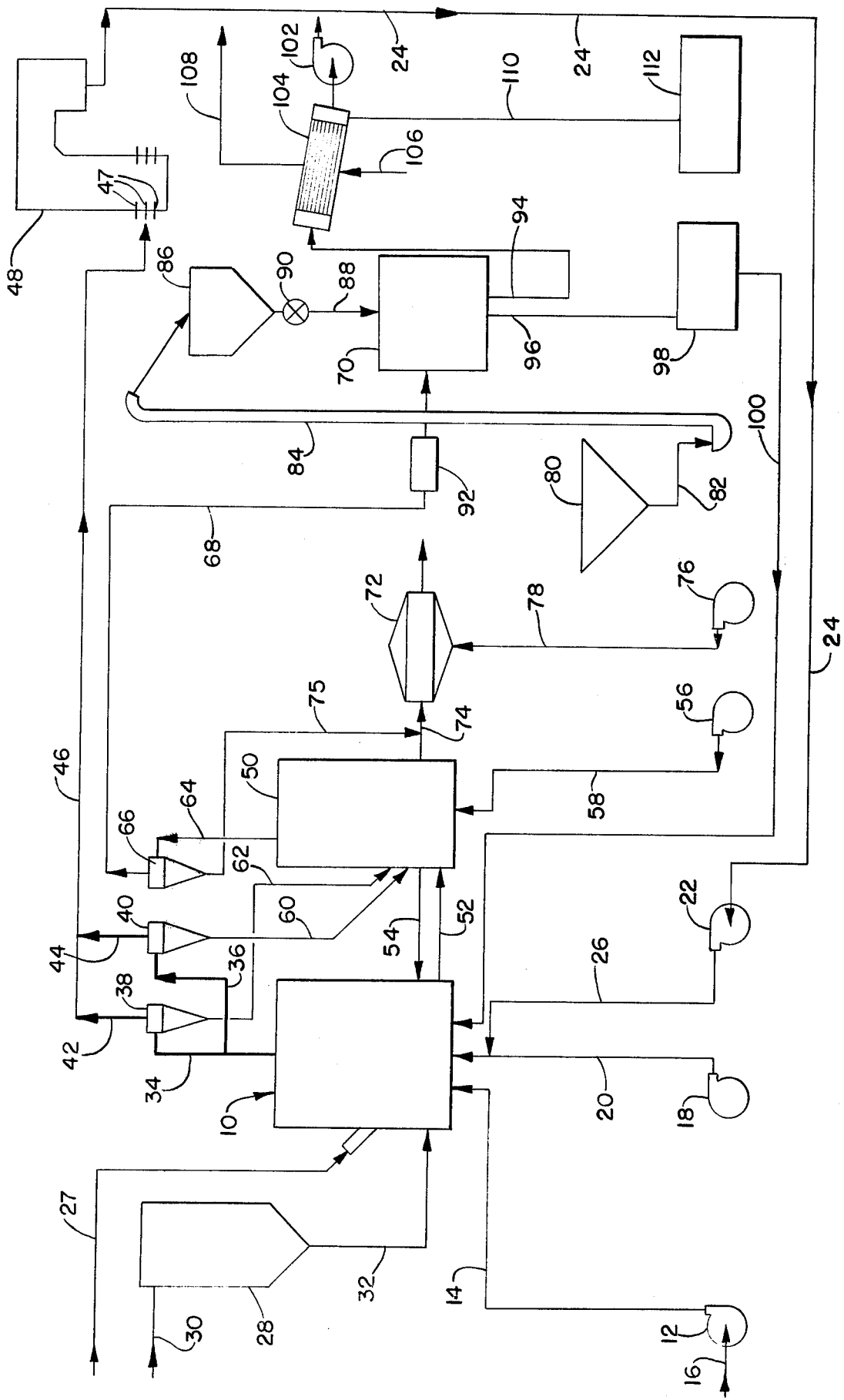

PROCESS FOR PRODUCING A FUEL GAS AND SULFUR FROM A HYDROCARBON FUEL

BACKGROUND OF THE INVENTION

This invention relates to a process for producing fuel gas and sulfur from a hydrocarbon fuel.

Hydrocarbon fuels which are normally burned in industrial installations, such as coal and oil fired power stations, contain sulfur which under normal circumstances is converted to sulfur dioxide in the combustion process and is vented to atmosphere with the other effluent gases from the process. In addition to being a major cause of air pollution, the sulfur dioxide also lowers product quality and reduces efficiency and production.

Several techniques have been proposed to reduce the content of sulfur in hydrocarbon fuels and in the fuel and flue gases derived therefrom, and many of these techniques involve the formation of a sulfur dioxide gas which must be subjected to a further reaction to produce elemental sulfur. However, these additional reactions are often relatively low in efficiency and thus reduce the overall efficiency of the complete separation process.

SUMMARY OF THE INVENTION

It is therefore an object of the present invention to provide a process for producing a fuel gas and sulfur from hydrocarbon fuel in which sulfur dioxide is initially separated from the fuel and then converted to elemental sulfur.

It is a further object of the present invention to provide a process of the above type which is relatively efficient in operation and which results in relatively high degree of sulfur recovery.

Toward the fulfillment of these and other objects, the process of the present invention comprises the steps of establishing a fluidized bed of sorbent material for the sulfur in the fuel, at least partially combusting the fuel in the bed under reducing conditions to produce a fuel gas and a sulfided sorbent, and passing the fuel gas externally of the bed. The sulfided sorbent is passed to a second fluidized bed for regenerating the sulfided sorbent to produce regenerated sorbent and a sulfur containing gas, and the sulfur containing gas is introduced with steam into a reactor vessel. A continuous supply of granular coal is passed through the reactor vessel in contact with the sulfur containing gas under conditions to produce elemental sulfur.

BRIEF DESCRIPTION OF THE DRAWINGS

The above brief description, as well as further objects, features, and advantages, of the present invention will be more fully appreciated by reference to the following detailed description of a presently preferred but nonetheless illustrative embodiment in accordance with the present invention, when taken in connection with the accompanying drawing which is a schematic representation of a system for carrying out the process of the present invention.

DESCRIPTION OF THE PREFERRED EMBODIMENTS

The drawing depicts a system for carrying out the process of the present invention including a fluidized bed gasifier, shown in general by the reference numeral 10, which receives a high sulfur fuel oil from a pump 12 via a line, or conduit with the pump receiving the oil from a source (not shown) via a line 16. An air blower 18 is provided which forces air through a line 20 to the gasifier 10. A blower 22 receives stack gas from a line 24 and passes the gas to a line 26 which is connected to the line 20 for passing the gas to the gasifier 10. The line 24 is adapted to receive stack gas from a boiler, as will be described in detail later.

A line 27 is connected to a source of natural gas and feeds the natural gas to the gasifier 10 to aid in start-up. A limestone storage vessel 28 receives limestone from a line 30 which, in turn, is connected to a source of the limestone, and a line 32 connects the vessel 28 to the gasifier 10 for feeding the limestone to the gasifier.

As a result of the above, an air fluidized bed of limestone is established in the lower portion of the gasifier 10 which operates with substoichiometric air, with the oil injected into the gasifier cracking and being partially combusted to form a hot low sulfur fuel gas consisting largely of carbon monoxide and some free hydrogen. Since the gasifier 10 is designed and operates in a conventional manner, it is shown only schematically in the drawings and will not be described in any further detail.

The fuel gas is passed, via lines 34 and 36, to a pair of cyclone separators 38 and 40, respectively, where the fine solid particles entrained in the gas will be separated therefrom. The gas passes from the cyclone separators 38 and 40, via lines 42 and 44, respectively, to a line 46 for conveying the fuel gas to a plurality of burners 47 associated with boiler 48. The boiler 48 operates in a conventional manner to generate heat for the purpose of vapor generation or the like, with the combustion gases from the boiler being passed, via line 24, to the gasifier 10 as discussed above to add heat to the fluidized bed in the gasifier.

During the above combustion in the gasifier 10, a hydrogen sulfide is also produced which reacts with the limestone to produce a calcium sulfide according to the following equation:

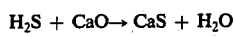

A regenerator 50, in the form of an air fluidized vessel, has an inlet connected, via a line 52, to an outlet of the gasifier 10, and an outlet connected, via a line 54, to an inlet of the gasifier 10. The line 52 supplies the calcium sulfide from the gasifier 10 to the regenerator 50, and an air blower 56 supplies air to the lower portion of the regenerator, via a line 58. A pair of lines 60 and 62 introduce the fine particles from the cyclone separators 38 and 40, respectively, into the regenerator 50. The regenerator 50 operates in a conventional manner under conditions sufficient to regenerate the calcium sulfide by reaction of oxygen with the utilized limestone to form a sulfur dioxide rich gas stream and a regenerated limestone according to the following reaction:

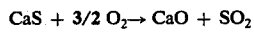

The sulfur dioxide stream is transported from the regenerator 50, via a line 64, to a cyclone separator 66 where any fine particles entrained in the stream are separated therefrom. The relatively pure sulfur dioxide gas is then passed from the separator 66, via a line 68, to a sulfur reduction unit 70 which will be further discussed later.

The regenerated limestone from the regenerator 50 is passed, via the line 54, back to the gasifier 10 where it combines with the hydrogen sulfide in accordance with the foregoing, and the spent portion of the limestone is passed to a storage vessel 72 via a line 74. A line 75 passes the fine particles separated from the sulfur dioxide stream at the cyclone separator 66 to the line 74 for passage to the vessel 72. A blower 76 supplies cooling air, via a line 78, to the vessel 72 to cool the spent limestone, which then can be disposed of in any known manner.

A coal feeder 80 receives coal from an external source and feeds same, via line 82, to an elevator 84 which supplies the coal to a storage vessel 86. A line 88 is connected to the vessel 86 and has a valve 90 disposed therein for selectively transferring the coal from the vessel to the sulfur reduction unit 70.

The sulfur reduction unit 70 will not be described in particular since it is disclosed and claimed in U.S. patent application Ser. No. 635,497 filed Nov. 26, 1975, by Peter Steiner, and assigned to the assignee of the present invention. The disclosure of this application is hereby incorporated by reference.

For the purpose of the present invention it is sufficient to note that the sulfur reduction unit 70 is in the form of a reactor vessel which is maintained at a predetermined elevated temperature sufficient to burn the coal continuously introduced therein through the line 88.

According to the present invention, the sulfur dioxide containing gas is passed through the line 68 where it may be mixed with steam from a source 92 before passing into the unit 70. As a result the sulfur dioxide containing gas is contacted with the burning granular coal in the unit 70 in the presence of the steam. In this manner, the sulfur dioxide is reduced to sulfur and hydrogen sulfide while the coal bed in the unit 70 is oxidized. The resulting sulfur gas is continuously passed from the unit 70 via a line 94 and the ash product resulting from the oxidation of the coal is continuously removed from the unit 70 via a line 96.

The line 96 is connected to an ash receiver 98 which collects the ash from the unit 70, and the ash is then passed to the gasifier 10 via a line 100, where it is introduced into the fluidized bed in the gasifier to combust any unburned carbon remaining in the ash.

A fan 102 draws the sulfur gas through the line 94 and through a condenser 104 which is adapted to circulate coolant, via lines 106 and 108, in a heat exchange relation with the sulfur gas to condense the latter before it is fed, via a line 110, to a tank 112 for final recovery.

It is thus seen that according to the process of the present invention an efficient removal of sulfur from the hydrocarbon fuel is successfully achieved.

It is noted that in prior art processes of $SO_2$ conversion, temperatures well above the 1550° F temperature range are common, and in fact, some prior art methods operate at temperatures above 2000° F. In accordance with the present invention, however, it is possible to obtain a high conversion of sulfur dioxide at a temperature range between 1100° F to 1550° F.

It is thus seen that according to the process of the present invention an efficient removal of sulfur from the hydrocarbon fuels is successfully achieved.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

I claim:

1. A process for producing a fuel gas and sulfur from a hydrocarbon fuel comprising the steps of establishing a first fluidized bed of sorbent material for the sulfur in said fuel, at least partially combusting said fuel in said bed under reducing conditions to produce a fuel gas and a sulfided sorbent, passing said fuel gas to the burners associated with a boiler, passing the combustion gases from said boiler to said fluidized bed, establishing a second fluidized bed, regenerating said sulfided sorbent in said second fluidized bed to produce regenerated sorbent and a sulfur containing gas, passing said sulfur containing gas into a reactor vessel, conveying a continuous supply of granular coal through said reactor vessel in contact with said sulfur containing gas under conditions to burn said coal and produce elemental sulfur, and passing the burned coal from said reactor vessel to said first fluidized bed to combust any unburned carbon present therein.

2. The method of claim 1, further comprising the step of mixing said sulfur containing gas with steam prior to said step of passing said gas to said vessel.

3. The process of claim 1, further comprising the step of passing the regenerated sorbent from said second fluidized bed to said first fluidized bed.

* * * * *